United States Patent
Lu

(10) Patent No.: US 10,372,964 B2
(45) Date of Patent: Aug. 6, 2019

(54) FINGERPRINT IDENTIFYING MODULE WITH INDICATING FUNCTION

(71) Applicant: Primax Electronics Ltd., Taipei (TW)

(72) Inventor: Tsung-Yi Lu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 207 days.

(21) Appl. No.: 15/596,229

(22) Filed: May 16, 2017

(65) Prior Publication Data

US 2018/0204039 A1    Jul. 19, 2018

(30) Foreign Application Priority Data

Jan. 13, 2017   (TW) .............................. 106101218 A

(51) Int. Cl.
*G06K 9/20* (2006.01)
*G06K 9/00* (2006.01)

(52) U.S. Cl.
CPC .................................. *G06K 9/0004* (2013.01)

(58) Field of Classification Search
CPC ............... G06K 9/0002; G06K 9/0004; G06K 9/00013–9/0012
See application file for complete search history.

(56) References Cited

U.S. PATENT DOCUMENTS

| | | | | |
|---|---|---|---|---|
| 5,862,248 A | * | 1/1999 | Salatino | G06F 3/044 382/124 |
| 2001/0050765 A1 | * | 12/2001 | Antonelli | G06K 9/00026 356/71 |
| 2007/0133847 A1 | * | 6/2007 | Ogura | G06K 9/00013 382/126 |
| 2017/0207352 A1 | * | 7/2017 | Ho | H01L 31/02327 |
| 2018/0114051 A1 | * | 4/2018 | Long | G06K 9/0004 |
| 2018/0232556 A1 | * | 8/2018 | Baek | G06K 9/00053 |

* cited by examiner

*Primary Examiner* — Brian Werner
(74) *Attorney, Agent, or Firm* — Kirton McConkie; Evan R. Witt

(57) ABSTRACT

The present invention relates to a fingerprint identifying module with an indicating function, including a circuit board, a fingerprint sensing element, a light emitting element, and a light guide structure. Both the fingerprint sensing element and the light emitting element are provided on the circuit board. The light guide structure surrounds the fingerprint sensing element and is close to the light emitting element; and may guide a light beam generated by the light emitting element, and enable the light beam to move within the light guide structure. Because the light guide structure surrounding the fingerprint sensing element generates a light emitting effect, a position of the fingerprint sensing element may be displayed.

7 Claims, 3 Drawing Sheets

FINGERPRINT IDENTIFYING MODULE WITH INDICATING FUNCTION

FIELD OF THE INVENTION

The present invention relates to an identity identifying assembly, and particularly to a fingerprint identifying module identifying a user identity by using a fingerprint.

BACKGROUND OF THE INVENTION

In recent years, the fingerprint identifying technology is applied to various electronic products, so that a user may input an own fingerprint into an electronic device and orders the electronic device to save the fingerprint. Subsequently, the user may input the own fingerprint by using a fingerprint identifying module so as to unlock the electronic device. Unlocking the electronic device by using the fingerprint identifying technology is quicker and more convenient than previous unlocking manners by manually inputting a password, and therefore is liked by the user. Moreover, requirements for the fingerprint identifying module are also increased.

Please refer to FIG. 1, and FIG. 1 is a side schematic diagram of a structure that a conventional fingerprint identifying module is provided on an electronic device. FIG. 1 shows an electronic device 1 and a conventional fingerprint identifying module 10. The electronic device 1 has a glass cover plate 11 which is provided on an upper surface of the electronic device 1, so as to protect the electronic device 1. The glass cover plate 11 has a an aperture 111, and a shape of the aperture 111 matches with a shape of the fingerprint identifying module 10, so as to accommodate the conventional fingerprint identifying module 10 therein. By using the aperture 111, the conventional fingerprint identifying module 10 may be enabled to be fixed on the electronic device 1, and the conventional fingerprint identifying module 10 is enabled to be exposed outside the glass cover plate 11, where the conventional fingerprint identifying module 10 is electrically connected to the electronic device 1. The conventional fingerprint identifying module 10 being exposed outside the glass cover plate 11 may provide two functions: first, the user may be enabled to visually observe a position at which the conventional fingerprint identifying module 10 is located, thereby facilitating a finger of the user to contact with the conventional fingerprint identifying module 10 to provide a fingerprint image of the finger; and second, because thickness of the glass cover plate 11 is much greater, if the conventional fingerprint identifying module 10 is provided below the glass cover plate 11, the conventional fingerprint identifying module 10 cannot obtain the fingerprint image of the finger.

As the development of technologies, a glass cover plate having lower thickness and high strength is made. Moreover, effectiveness of the fingerprint identifying module is also improved, and therefore, the fingerprint identifying module may be provided on an upper surface of the electronic device. Moreover, the glass cover plate covers the fingerprint identifying module and the electronic device, so as to have an aesthetic appearance. This configuration manner is called as IFS (Invisible Fingerprint Sensor). However, the fingerprint identifying module is covered by the glass cover plate, so that the user cannot visually observe the position of the fingerprint identifying module. Therefore, it is difficult to align the finger with the fingerprint identifying module, so that the fingerprint image of the finger cannot be obtained.

Therefore, a fingerprint identifying module with an indicating function which has functionality and an aesthetic appearance is needed.

SUMMARY OF THE INVENTION

An objective of the present invention is providing a fingerprint identifying module with an indicating function.

In a preferred embodiment, the present invention provides a fingerprint identifying module with an indicating function which is provide between an electronic device and a glass cover plate, where the fingerprint identifying module with an indicating function includes a circuit board, a fingerprint sensing element, a light emitting element, and a light guide structure. The fingerprint sensing element is provided on the circuit board, and is configured to detect a fingerprint image of a finger. The light emitting element is provided on the circuit board, is located below the fingerprint sensing element, and is configured to generate a light beam. The light guide structure surrounds the fingerprint sensing element, is close to the light emitting element, and is configured to guide the light beam and enable the light beam to move within the light guide structure, so as to display a position of the fingerprint sensing element.

In a preferred embodiment, light guide structure includes a surrounding portion, a light incident portion, a reflection portion, and an extension portion. The surrounding portion surrounds the fingerprint sensing element, and for the light beam to move within the light guide structure, so as to enable the surrounding portion to emit light. The light incident portion is close to the light emitting element for the light beam to enter; and the reflection portion is close to the light incident portion, and is configured to reflect the light beam. The extension portion is located between the surrounding portion and the reflection portion, and is configured to enable the light beam to pass through and be projected to the surrounding portion. The light guide structure may display, according to the surrounding portion which emits light, a position of the fingerprint sensing element.

Briefly, the fingerprint identifying module with an indicating function of the present invention combines the light emitting element, the light guide structure, the fingerprint sensing element, and the circuit board, and a part of the light guide structure surrounds the fingerprint sensing element. When the light emitting element is driven, the light beam generated by the light emitting element may be projected to the light guide structure, and the position of the fingerprint sensing element may be displayed by using the light guide structure which emits light, so as to prompt the user that the fingerprint image of the finger may be provided. Therefore, the fingerprint identifying module of the present invention may provide, under a structure of an IFS configuration, an indicating function so as to have functionality and an aesthetic appearance.

DETAILED DESCRIPTION OF THE PREFERRED EMBODIMENT

Figure 1:
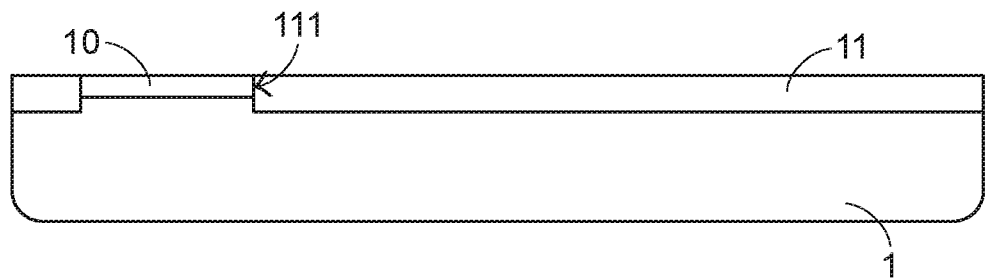
FIG. 1 is a schematic side view of a structure that a conventional fingerprint identifying module is provided on an electronic device.
Figure 2:
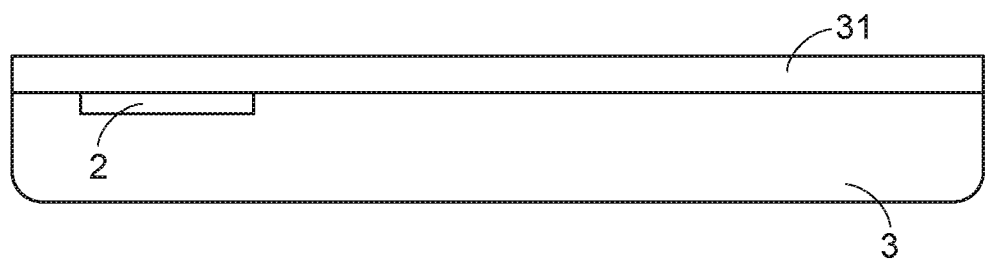
FIG. 2 is a schematic side view of a structure that, in a first preferred embodiment, a fingerprint identifying module of the present invention is provided on an electronic device.
Figure 3:
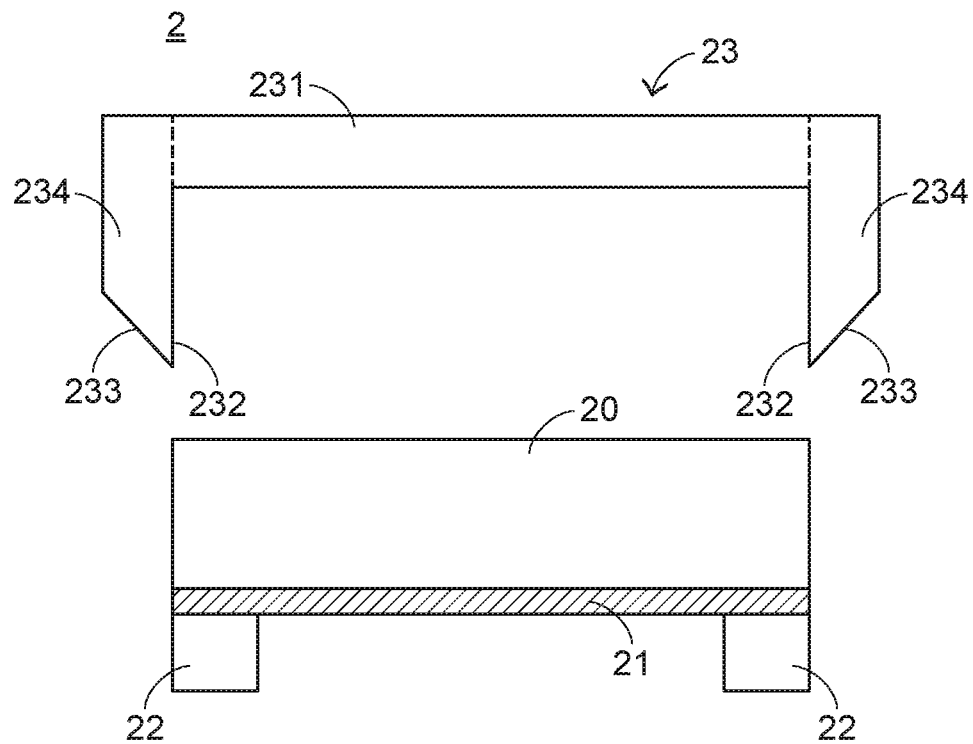
FIG. 3 is an exploded side view of a structure of a fingerprint identifying module of the present invention in a first preferred embodiment.

The present invention provides a fingerprint identifying module which may solve conventional technical problems. Please refer to FIG. 2 and FIG. 3 at the same time. FIG. 2 is a schematic side view of a structure that, in a first preferred embodiment, a fingerprint identifying module of the present invention is provided on an electronic device; and FIG. 3 is an exploded side view of a structure of a fingerprint identifying module of the present invention in a first preferred embodiment. FIG. 2 shows that a fingerprint identifying module 2 is provided between an electronic device 3 and a glass cover plate 31, that is, an IFS configuration manner. The fingerprint identifying module 2 includes a fingerprint sensing element 20, a circuit board 21, a plurality of light emitting elements 22, and a light guide structure 23. The fingerprint sensing element 20 is provided on an upper surface of the circuit board 21 and is electrically connected to the circuit board 21, and a function of the fingerprint sensing element 20 is detecting a fingerprint image of a finger. The fingerprint sensing element 20 is combined with a circuit board 30 by using a Surface Mount Technology (SMT). The plurality of light emitting elements 22 are provided on a lower surface of the circuit board 21 and are located below the fingerprint sensing element 20, and may generate a light beam B. The light guide structure 23 surrounds the fingerprint sensing element 20 and is close to the plurality of light emitting elements 22; and may guide the light beam B and enable the light beam to move within the light guide structure 23, so as to display a position of the fingerprint sensing element 20.

In this preferred embodiment, the fingerprint sensing element 20 is packed in a manner of land grid array (LGA) or ball grid array (BGA); the circuit board 30 may be selected as a flexible circuit board (FPC) or a rigid-flex board; and the light emitting elements 22 are lateral light emitting diodes.

Figure 4:
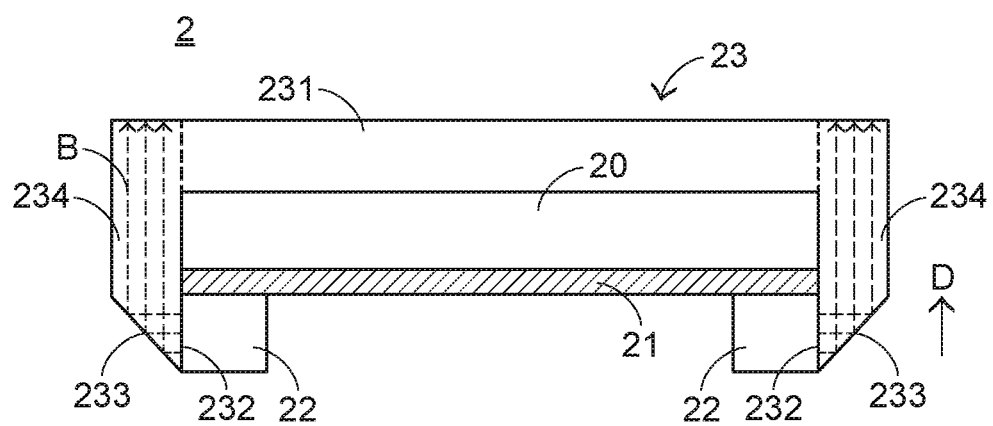
FIG. 4 is a schematic side view of a structure of a fingerprint identifying module of the present invention in a first preferred embodiment.
Figure 5:
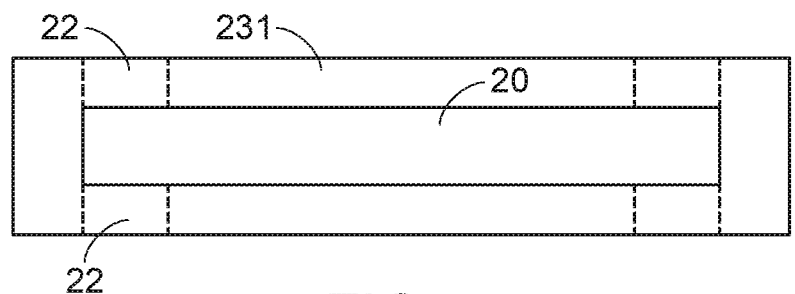
FIG. 5 is a schematic top view of a structure of a fingerprint identifying module of the present invention in a first preferred embodiment.

Please refer to FIG. 3, FIG. 4, and FIG. 5 at the same time. FIG. 4 is a schematic side view of a structure of a fingerprint identifying module of the present invention in a first preferred embodiment; and FIG. 5 is a schematic top view of a structure of a fingerprint identifying module of the present invention in a first preferred embodiment. The light guide structure 23 includes a surrounding portion 231, a plurality of light incident portions 232, a plurality of reflection portions 233, and a plurality of extension portions 234. A shape of the surrounding portion 231 matches with a shape of the fingerprint sensing element 20, so as to surround the fingerprint sensing element 20. The surrounding portion 231 may enable the light beam B to move within therein, thereby generating a light emitting effect. Each light incident portion 232 corresponds to a light emitting element 22, and is close to the corresponding light emitting element 22, thereby enabling the light beam B to enter the light guide structure 23 through the light incident portions 232. The reflection portions 233 are close to the light incident portions 232 and may reflect the light beam B. The extension portions 234 are located between the surrounding portion 231 and the reflection portions 233 and extend along a vertical direction D. In this way, the light beam B may be enabled to pass through and be projected to the surrounding portion 231. In this preferred embodiment, the surrounding portion 231, the plurality of light incident portions 232, and the plurality of extension portions 234 in the light guide structure 23 are integrally molded structures.

The light guide structure 23 may further provide a function of indicating the position of the fingerprint sensing element 20, that is, may also show the position of the fingerprint sensing element 20 according to the surrounding portion 231. A user may visually observe the surrounding portion 231 which emits light, and an infer side of the surrounding portion 231 is the position of the fingerprint sensing element 20. In this preferred embodiment, the reflection portions 233 are slope portions between the light incident portions 232 and the extension portions 234, and are formed by providing a high-reflective coating film on the slope portions; this is merely for illustration purposes, and is not limited thereto. In another preferred embodiment, the reflection portions may also use reflective sheets provided on the slope portions.

The fingerprint identifying module 2 assembled by various components is shown in FIG. 4. Although the plurality of light emitting elements 22 are located below the fingerprint sensing element 20, because the plurality of extension portions 234 in the light guide structure 23 extend along a vertical direction D, the light beam B generated by the plurality of light emitting elements 22 may be guided from below the fingerprint sensing element 20 to the surrounding portion 231 surrounding the fingerprint sensing element 20. So that a light emitting effect may be generated to the fingerprint identifying module 2, and an indicating function may be provided at the same time.

It should be noted that, the fingerprint sensing element 20 and the plurality of light emitting elements 22 are electrically connected to an external control unit (not shown in the figure) through the circuit board 21, where the external control unit is, for example, a processor within the electronic device 3. When the external control unit determines that the electronic device 3 needs to identify an identity, the external control unit drives the plurality of light emitting elements 22 to generate a light beam B. In this way, the light beam B passes through the light incident portions 232, the reflection portions 233, and the extension portions 234 to be projected into the surrounding portion 231. In other words, the indicating function of the fingerprint identifying module 2 of the present invention is determined whether to be initiated by the external control unit through operation of software or firmware, without needing to provide, on the fingerprint identifying module 2, a detecting assembly which detects that a finger is approaching. Therefore, thickness of the fingerprint identifying module 2 may be reduced. Definitely, the fingerprint identifying module of the present invention is not defined as that a detecting assembly cannot be provided therein, and the detecting assembly may also be one of the means for driving the indicating function.

Figure 6:
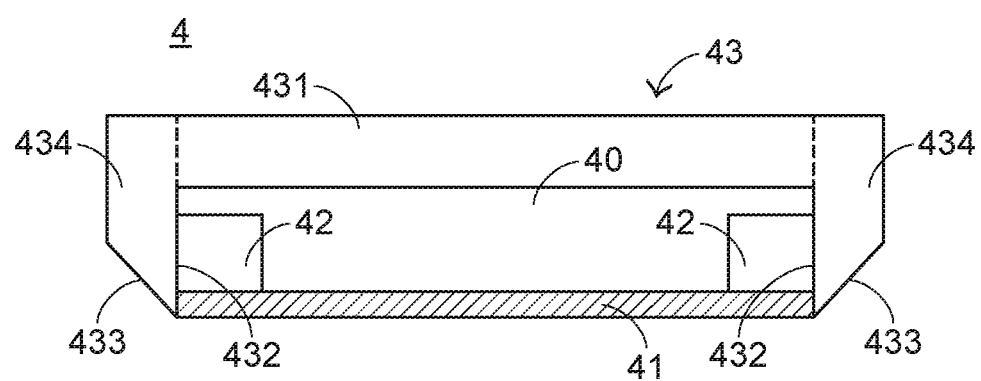
FIG. 6 is an exploded side view of a structure of a fingerprint identifying module of the present invention in a second preferred embodiment.

In addition, the present invention may further provide a fingerprint identifying module different from the foregoing configuration. Please refer to FIG. 6, and FIG. 6 is an exploded side view of a structure of a fingerprint identifying module of the present invention in a second preferred embodiment. A fingerprint identifying module 4 includes a fingerprint sensing element 40, a circuit board 41, a plurality of light emitting elements 42, and a light guide structure 43.

The light guide structure 43 includes a surrounding portion 431, a plurality of light incident portions 432, a plurality of reflection portions 433, and a plurality of extension portions 434. Structures and functions of these components are same to those in the foregoing preferred embodiments, and details are not provided herein again. Difference from the foregoing preferred embodiments is that the fingerprint sensing element 40 and the plurality of light emitting elements 42 are provided at an upper surface of the circuit board 41, and thickness of the fingerprint sensing element 40 is slightly increased, while length of the extension portions 434 is slightly shortened. Briefly, corresponding position changes may be made to these components according to the actual requirements, without affecting normal operation of each component.

It can be known from the above that the fingerprint identifying module of the present invention combines the light emitting elements, the light guide structure, the fingerprint sensing element, and the circuit board, and a part of the light guide structure surrounds the fingerprint sensing element. When the light emitting elements are driven, the light beam generated by the light emitting elements may be projected to the light guide structure, and the position of the fingerprint sensing element may be displayed by using the light guide structure which emits light, so as to prompt the user that the fingerprint image of the finger may be provided. Therefore, the fingerprint identifying module of the present invention may provide, under a structure of an IFS configuration, an indicating function so as to have functionality and an aesthetic appearance.

The foregoing is merely the preferable embodiments of the present invention, and is not intended to limit the scope of the present invention. Therefore, any other equivalent replacement or modification made without departing from the spirit disclosed by the present invention shall fall within the scope of the present invention.

What is claimed is:

1. A fingerprint identifying module with an indicating function, provided between an electronic device and a glass cover plate, wherein the fingerprint identifying module with an indicating function comprises:
   a circuit board;
   a fingerprint sensing element, provided on an upper surface of the circuit board, and configured to detect a fingerprint image of a finger;
   a light emitting element, provided on a lower surface of the circuit board, located below the fingerprint sensing element, and configured to generate a light beam; and
   a light guide structure, surrounding the fingerprint sensing element, close to the light emitting element, and configured to guide the light beam and enable the light beam to move within the light guide structure, so as to display a position of the fingerprint sensing element.

2. The fingerprint identifying module with an indicating function according to claim 1, wherein the light guide structure comprises:
   a surrounding portion, surrounding the fingerprint sensing element, and for the light beam to move within the light guide structure, so as to enable the surrounding portion to emit light;
   a light incident portion, close to the light emitting element for the light beam to enter;
   a reflection portion, close to the light incident portion, and configured to reflect the light beam; and
   an extension portion, located between the surrounding portion and the reflection portion, and configured to enable the light beam to pass through and be projected to the surrounding portion, wherein, the light guide structure may display, according to the surrounding portion which emits light, a position of the fingerprint sensing element.

3. The fingerprint identifying module with an indicating function according to claim 2, wherein the reflection portion is a slope portion between the light incident portion and the extension portion, and is formed by providing a high-reflective coating film on the slope portion.

4. The fingerprint identifying module with an indicating function according to claim 1, wherein the fingerprint sensing element and the light emitting element are both provided on an upper surface of the circuit board.

5. The fingerprint identifying module with an indicating function according to claim 1, wherein the fingerprint sensing element is provided on the circuit board by using a Surface Mount Technology (SMT).

6. The fingerprint identifying module with an indicating function according to claim 1, wherein the fingerprint sensing element is packed in a manner of land grid array (Land Grid Array, LGA) or ball grid array (Ball Grid Array, BGA).

7. The fingerprint identifying module with an indicating function according to claim 1, wherein the circuit board is a flexible circuit board (FPC).

* * * * *